US012341277B2

(12) United States Patent
Yayoshi et al.

(10) Patent No.: US 12,341,277 B2
(45) Date of Patent: Jun. 24, 2025

(54) CONNECTOR

(71) Applicant: JAPAN AVIATION ELECTRONICS INDUSTRY, LIMITED, Tokyo (JP)

(72) Inventors: Tadamichi Yayoshi, Tokyo (JP); Yosuke Honda, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 384 days.

(21) Appl. No.: 18/091,729

(22) Filed: Dec. 30, 2022

(65) Prior Publication Data

US 2023/0261401 A1 Aug. 17, 2023

(30) Foreign Application Priority Data

Feb. 15, 2022 (JP) ................................ 2022-021499

(51) Int. Cl.

| | |
|---|---|
| ***H01R 12/70*** | (2011.01) |
| ***H01R 12/57*** | (2011.01) |
| ***H01R 12/71*** | (2011.01) |
| ***H01R 13/04*** | (2006.01) |
| ***H01R 13/50*** | (2006.01) |
| ***H01R 43/24*** | (2006.01) |

(52) U.S. Cl.

CPC ........... *H01R 12/716* (2013.01); *H01R 12/57* (2013.01); *H01R 13/04* (2013.01); *H01R 13/50* (2013.01)

(58) Field of Classification Search

CPC ...... H01R 43/24; H01R 13/50; H01R 13/405; H01R 13/04; H01R 12/73; H01R 12/716; H01R 12/57

See application file for complete search history.

(56) References Cited

U.S. PATENT DOCUMENTS

| | | | | |
|---|---|---|---|---|
| 9,391,398 | B2 * | 7/2016 | Omodachi ........... | H01R 12/707 |
| 11,095,059 | B2 * | 8/2021 | Gondo ................. | H01R 13/502 |
| 11,233,346 | B2 * | 1/2022 | Gondo ................. | H01R 12/707 |
| 2006/0264075 | A1 * | 11/2006 | Obikane ................ | H01R 24/60 439/74 |
| 2010/0022140 | A1 * | 1/2010 | Frantum, Jr. ........ | H01R 12/724 439/676 |
| 2017/0264048 | A1 * | 9/2017 | Ashibu ................ | H01R 13/631 |

(Continued)

FOREIGN PATENT DOCUMENTS

| | | |
|---|---|---|
| JP | 2020181803 A | 11/2020 |

*Primary Examiner* — Abdullah A Riyami
*Assistant Examiner* — Thang H Nguyen
(74) *Attorney, Agent, or Firm* — Holtz, Holtz & Volek PC

(57) ABSTRACT

A connector comprises an insert-molded body. The insert-molded body comprises a holding member and a plurality of terminals. The terminals include at least one first terminal and at least one second terminal. The first terminal has a first mounted portion and a first main portion. The first mounted portion has a first carrier cut-off surface which is an end surface of the first mounted portion. The end surface of the first mounted portion faces in a width direction. The second terminal has a second mounted portion, a second main portion and an unmounted portion. The unmounted portion has a second carrier cut-off surface which is an end surface of the unmounted portion. The end surface of the unmounted portion faces in the width direction. The first carrier cut-off surface and the second carrier cut-off surface face in orientations same as each other in the width direction.

6 Claims, 10 Drawing Sheets

(56) References Cited

U.S. PATENT DOCUMENTS

| | | | | |
|---|---|---|---|---|
| 2018/0248287 | A1* | 8/2018 | Ashibu | H01R 12/707 |
| 2020/0127400 | A1* | 4/2020 | Sasayama | H01R 4/02 |
| 2020/0235506 | A1* | 7/2020 | Hosoda | H01R 12/716 |
| 2020/0343659 | A1* | 10/2020 | Gondo | H01R 13/502 |
| 2022/0200186 | A1 | 6/2022 | Gondo | |

* cited by examiner

CONNECTOR

CROSS REFERENCE TO RELATED APPLICATIONS

This application is based on and claims priority under 35 U.S.C. § 119 to Japanese Patent Applications No. JP 2022-021499 filed Feb. 15, 2022, the contents of which are incorporated herein in their entirety by reference.

BACKGROUND OF THE INVENTION

This invention relates to a connector comprising an insert-molded body.

Referring to FIGS. 17 and 18, JP-A 2020-181803 (Patent Document 1) discloses a connector 900 of this type. The connector 900 comprises two half-bodies 910 and two cover portions 920. Each of the half-bodies 910 has a housing 912 and a plurality of terminals 914. The terminals 914 are embedded in and held by the housing 912. Opposite end portions 911 of the half-body 910 in the Y-direction are covered with the cover portions 920, respectively.

Referring to FIGS. 17, 18 and 19, the connector 900 of Patent Document 1 is manufactured as follows: each of the half-bodies 910 is formed by integrally molding the housing 912 with the terminals 914, which are coupled with carriers 930, by insert-molding; one of the carriers 930, which is positioned at one side of the half-body 910, is cut off so that some of the terminals 914 are formed with carrier cut-off surfaces 9142; the two half-bodies 910 are arranged in face-to-face relationship in an X-direction, or in a width direction; the cover portions 920 are over-molded on the opposite end portions 911 of the two half-bodies 910 so that the opposite end portions 911 of one of the half-bodies 910 are coupled with the opposite end portions 911, respectively, of a remaining one of the half-bodies 910; and a remaining one of the carriers 930 is cut off. In other words, the manufacturing method of the connector 900 of Patent Document 1 requires two molding steps, namely, a primary molding step, in which the housing 912 is integrally molded with the terminals 914, and a secondary molding step in which the cover portions 920 are formed by over-molding.

SUMMARY OF THE INVENTION

It is therefore an object of the present invention to provide a connector which has a structure more suitable for insert-molding.

One possible manufacturing method of a connector with a single terminal row is to integrally molding a housing with only terminals, which are coupled with a carrier at the same side of the housing in a width direction, by insert-molding. In the aforementioned manufacturing method, a die used for the insert-molding of the housing can be downsized. However, if such a connector, whose terminals are arranged at small intervals, is manufactured by the aforementioned manufacturing method, the terminals might be short-circuited with each other.

The present inventors of the present application have conceived a connector which is configured so that an unmounted portion of one of adjacent two terminals in a pitch direction is positioned above a mounted portion of a remaining one of the adjacent two terminals and thereby the unmounted portion of the one of the adjacent two terminals and the mounted portion of the remaining one of the adjacent two terminals are positioned as far as possible from each other. The present inventors have found that such a connector has increased electrical reliability and that such a connector also has a structure suitable for insert-molding. The present invention stems from the finding.

One aspect of the present invention provides a connector mounted on a circuit board when used. The connector is mateable in an up-down direction with a mating connector which has a mating terminal. The connector comprises an insert-molded body. The insert-molded body comprises a holding member and a plurality of terminals. The terminals are, at least in part, embedded in and held by the holding member. The terminals include at least one first terminal and at least one second terminal. The first terminal and the second terminal are arranged in a pitch direction perpendicular to the up-down direction. The first terminal has a first mounted portion and a first main portion. The first mounted portion extends in a width direction perpendicular to both the up-down direction and the pitch direction. Under a mounted state where the connector is mounted on the circuit board, the first mounted portion is connected to and fixed on the circuit board. The first mounted portion has a first carrier cut-off surface which is an end surface of the first mounted portion. The end surface of the first mounted portion faces in the width direction. The first main portion extends from the first mounted portion. The first main portion is provided with a first contact portion. The first contact portion is brought into contact with the mating terminal under a mated state where the connector and the mating connector are mated with each other. The first contact portion is positioned above the first mounted portion in the up-down direction. The second terminal has a second mounted portion, a second main portion and an unmounted portion. The second mounted portion extends in the width direction. Under the mounted state, the second mounted portion is connected to and fixed on the circuit board. The second main portion couples the second mounted portion and the unmounted portion with each other. The second main portion is provided with a second contact portion. The second contact portion is brought into contact with the mating terminal under the mated state. The unmounted portion extends in the width direction. The unmounted portion is positioned apart from the second mounted portion in the width direction. The unmounted portion is positioned above the first mounted portion in the up-down direction. The unmounted portion is nearer to the first mounted portion than the second mounted portion is. The unmounted portion has a second carrier cut-off surface which is an end surface of the unmounted portion. The end surface of the unmounted portion faces in the width direction. The first carrier cut-off surface and the second carrier cut-off surface face in orientations same as each other in the width direction.

The connector of the present invention is configured as follows: the terminals include the at least one first terminal and the at least one second terminal; the first mounted portion has the first carrier cut-off surface which is the end surface of the first mounted portion; the end surface of the first mounted portion faces in the width direction; the unmounted portion of the second terminal is positioned above the first mounted portion of the first terminal in the up-down direction; the unmounted portion has the second carrier cut-off surface which is the end surface of the unmounted portion; the end surface of the unmounted portion faces in the width direction; and the first carrier cut-off surface and the second carrier cut-off surface face in the orientations same as each other in the width direction. Thus, the connector of the present invention can be manufactured by integrally molding the holding member, or a housing, with the terminals, which are coupled to a carrier at the same side of the holding member in the width direction, by insert-molding. In other words, the connector of the present invention has a structure more suitable for insert-molding.

According to the present invention, a connector with two terminal rows can be manufactured as follows: a holding member is integrally molded with terminals, which are coupled with a carrier at one of opposite sides of the holding member in the width direction, and terminals, which are coupled with another carrier at a remaining one of the opposite sides of the holding member in the width direction, by insert-molding. That is, if the present invention is applied to a connector with two terminal rows, the connector can be manufactured in a single molding step without the need of the secondary molding step which is required by the manufacturing method of the connector 900 of Patent Document 1.

An appreciation of the objectives of the present invention and a more complete understanding of its structure may be had by studying the following description of the preferred embodiment and by referring to the accompanying drawings.

Figure 1:
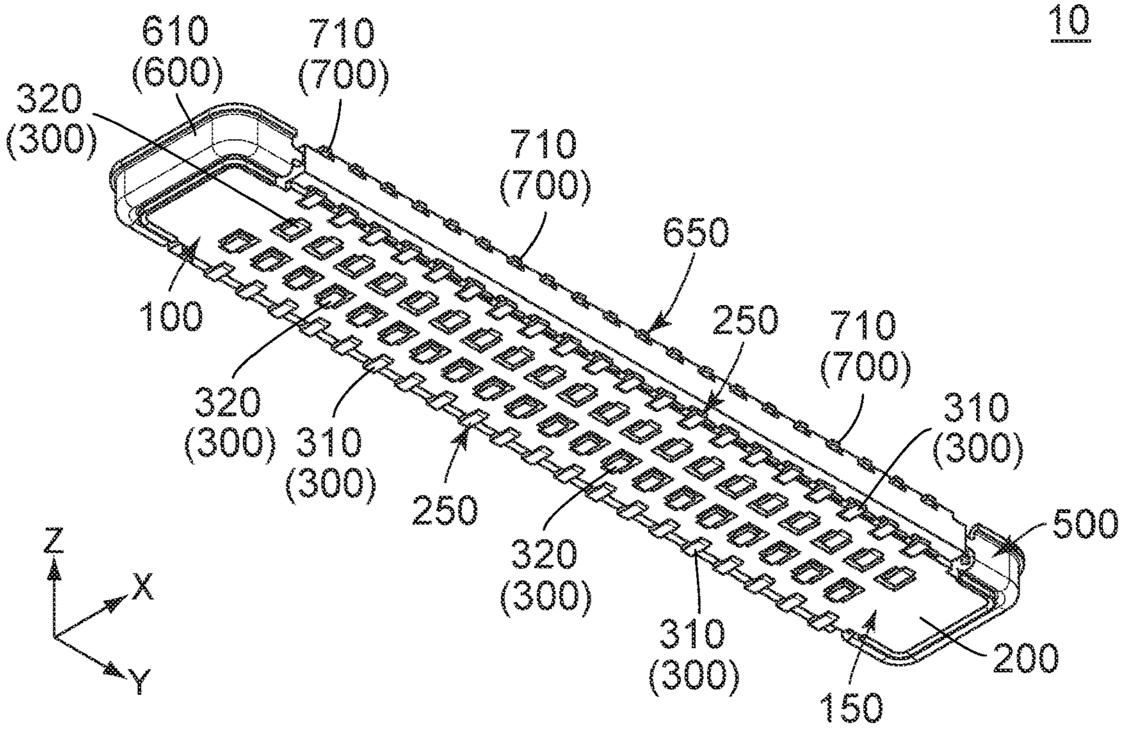
FIG. 1 is a perspective view showing an assembly according to an embodiment of the present invention. In the figure, a connector and a mating connector are mated with each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As shown in FIG. 1, an assembly 10 according to an embodiment of the present invention comprises a connector 100 and a mating connector 500.

Figure 4:
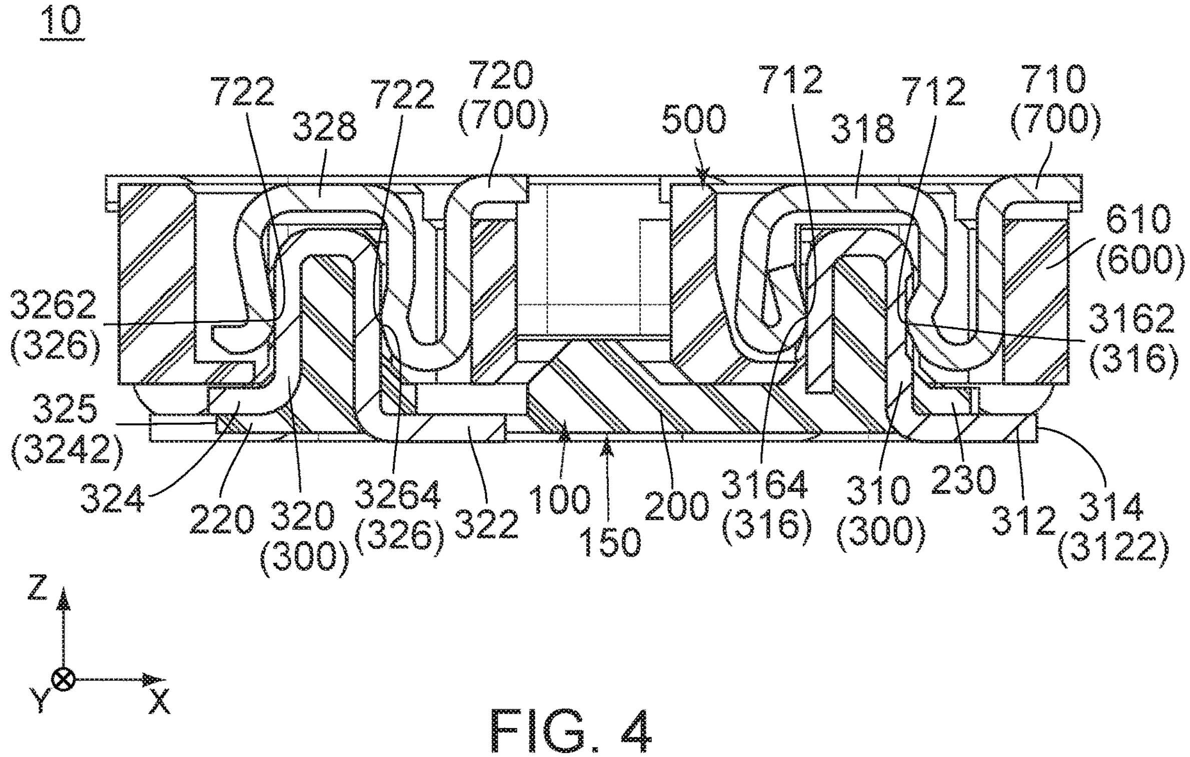
FIG. 4 is a cross-sectional view showing the assembly of FIG. 3, taken along line A-A.
Figure 5:
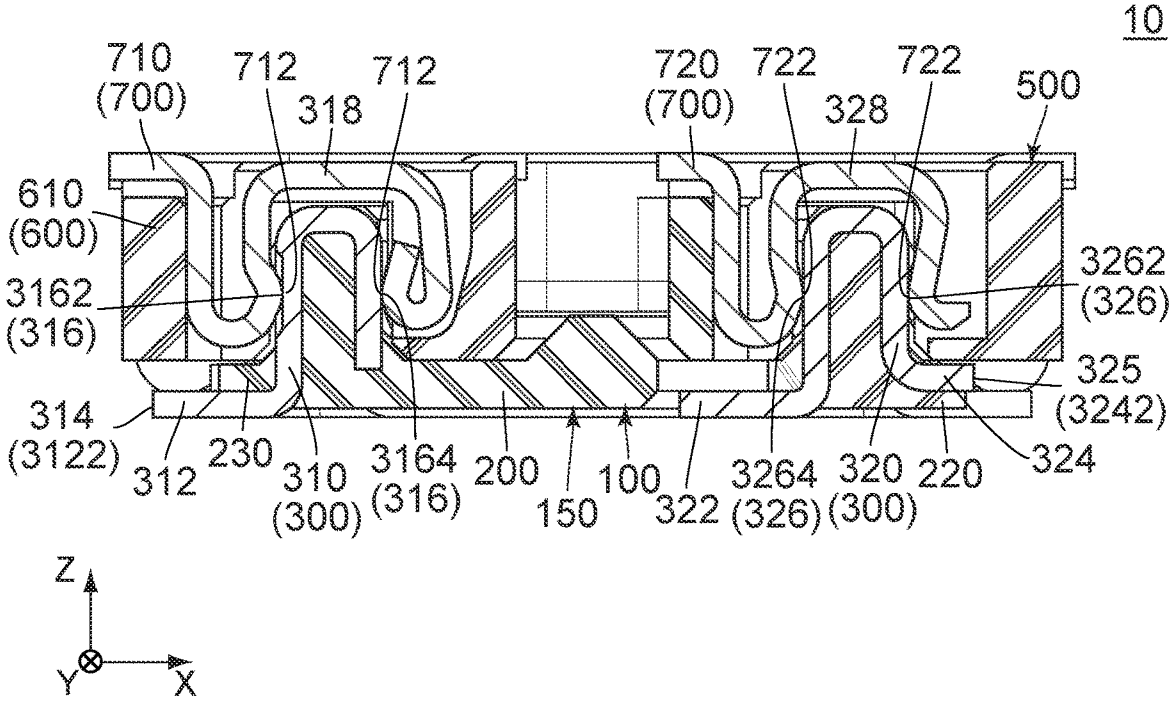
FIG. 5 is a cross-sectional view showing the assembly of FIG. 3, taken along line B-B.

Referring to FIGS. 4 and 5, the mating connector 500 of the present embodiment is mounted on a circuit board (not shown) when used. The mating connector 500 is mateable with the connector 100 in an up-down direction. In the present embodiment, the up-down direction is a Z-direction. Specifically, upward is a positive Z-direction while downward is a negative Z-direction.

As shown in FIGS. 4 and 5, the mating connector 500 comprises a mating holding member 600 and a plurality of mating terminals 700.

Figure 2:
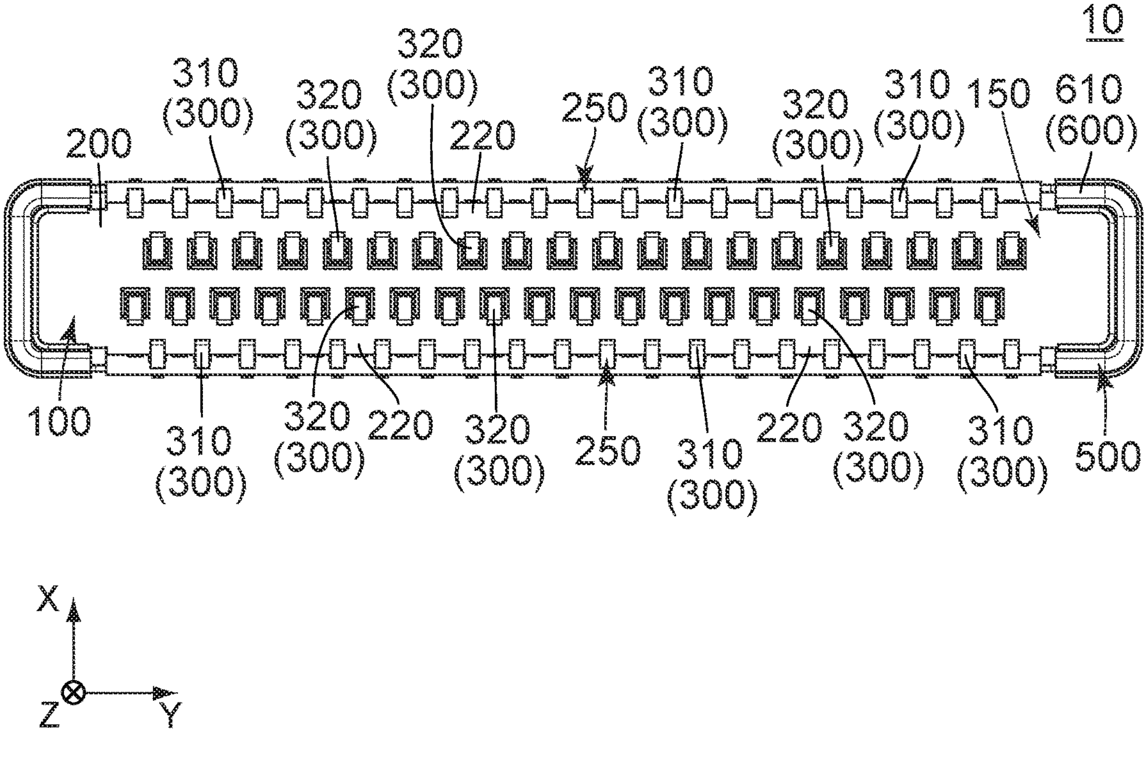
FIG. 2 is a bottom view showing the assembly of FIG. 1.
Figure 3:
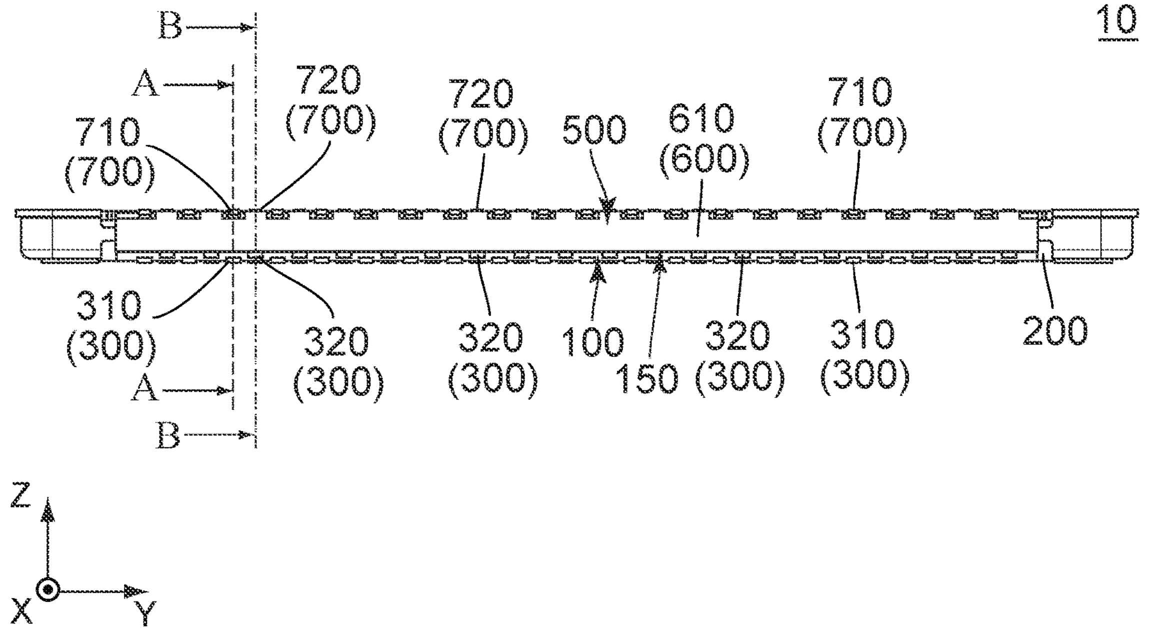
FIG. 3 is a side view showing the assembly of FIG. 1.

Referring to FIG. 4, the mating holding member 600 of the present embodiment is made of insulator. The mating holding member 600 has a surrounding wall portion 610. Referring to FIG. 2, the surrounding wall portion 610 defines outer ends in a width direction perpendicular to the up-down direction. In the present embodiment, the width direction is an X-direction. The width direction is also referred to as a front-rear direction. Specifically, it is assumed that forward is a positive X-direction while rearward is a negative X-direction. The surrounding wall portion 610 defines outer ends in a pitch direction perpendicular to both the up-down direction and the width direction. In the present embodiment, the pitch direction is a Y-direction.

Referring to FIGS. 1 and 4, the mating connector 500 has two mating terminal rows 650 which are positioned apart from each other in the width direction. In other words, the two mating terminal rows 650 are positioned apart from each other in the front-rear direction. However, the present invention is not limited thereto, but the number of the mating terminal row 650 may be one.

Referring to FIGS. 1 and 4, each of the mating terminal rows 650 consists of the mating terminals 700 which are arranged in the pitch direction perpendicular to both the up-down direction and the width direction.

Referring to FIG. 4, each of the mating terminals 700 of the present embodiment is made of metal. The mating terminals 700 are held by the mating holding member 600. The mating terminals 700 consists of a plurality of first mating terminals 710 and a plurality of second mating terminals 720. Each of the first mating terminals 710 has first mating contact portions 712. Each of the second mating terminals 720 has second mating contact portions 722.

Figure 6:
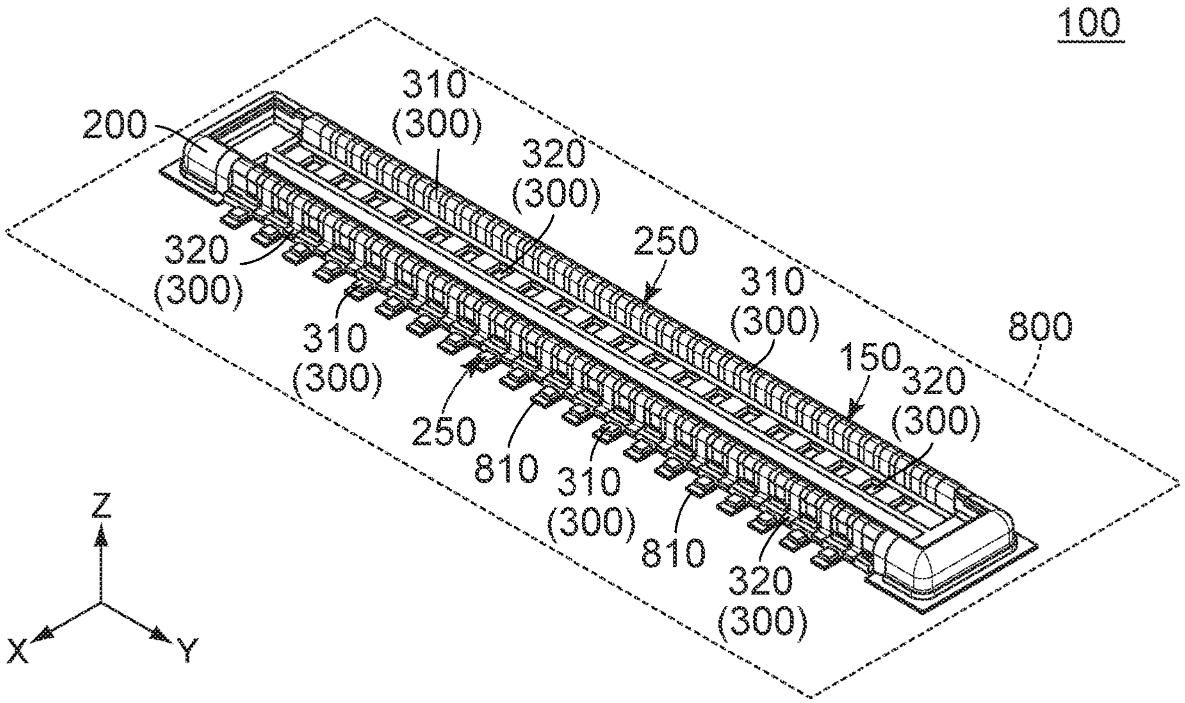
FIG. 6 is a perspective view showing the connector which is included in the assembly of FIG. 1. In the figure, the connector is mounted on a circuit board, and the circuit board is illustrated by dotted line.

Referring to FIG. 6, the connector 100 of the present embodiment is mounted on a circuit board 800 when used.

Referring to FIG. 4, the connector 100 is mateable in the up-down direction with the mating connector 500 which has the mating terminals 700.

Figure 7:
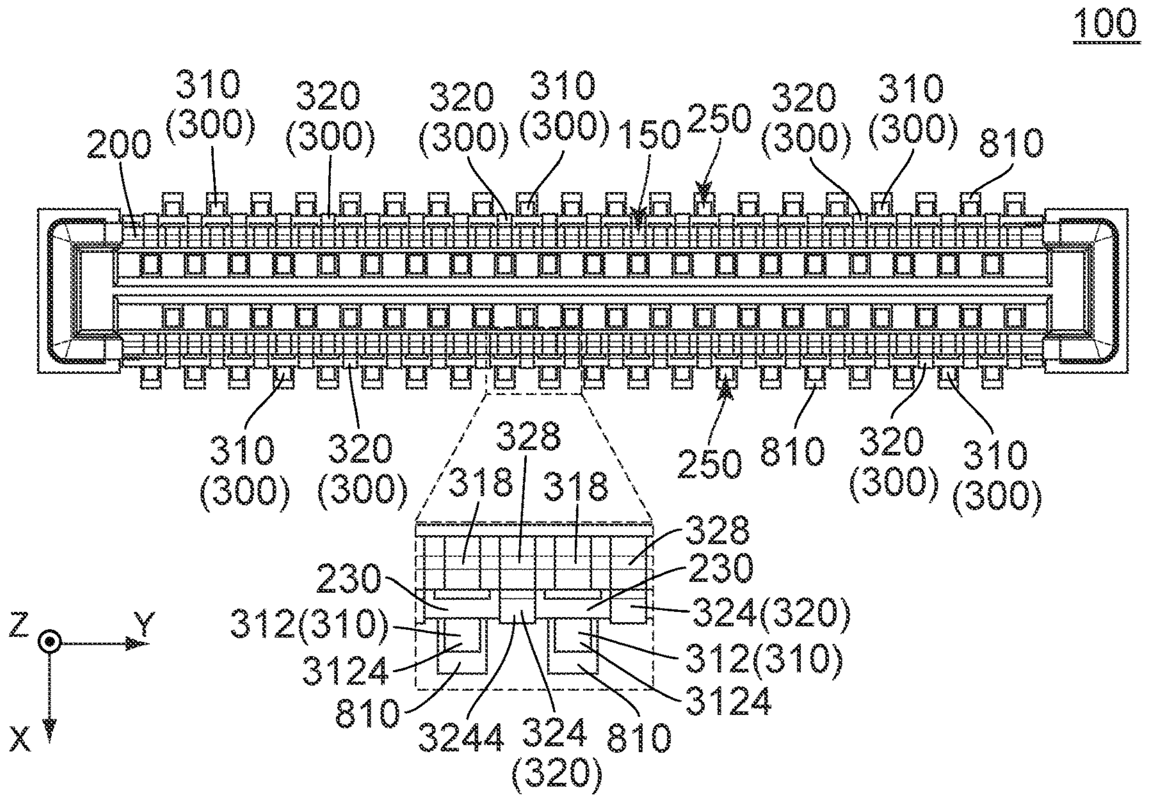
FIG. 7 is a top view showing the connector of FIG. 6. In the figure, a part of an insert-molded body is enlarged and illustrated. Additionally, regarding the circuit board, the figure shows not all components, but only pads.

As shown in FIG. 7, the connector 100 comprises an insert-molded body 150.

As shown in FIG. 7, the insert-molded body 150 of the present embodiment comprises a holding member 200 and a plurality of terminals 300.

Figure 8:
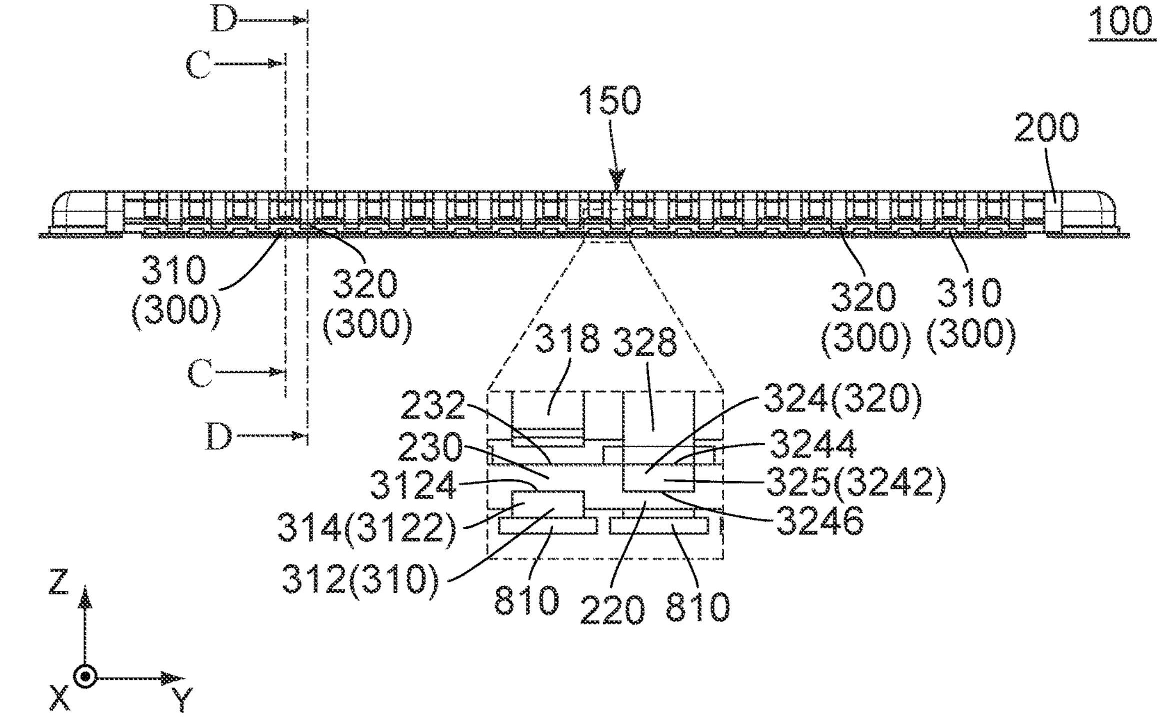
FIG. 8 is a side view showing the connector of FIG. 6. In the figure, a part of the insert-molded body is enlarged and illustrated. Additionally, regarding the circuit board, the figure shows not all the components, but only the pads.

Referring to FIG. 8, the holding member 200 of the present embodiment is made of insulator. The holding member 200 has a plurality of insulating protection portions 220 and a plurality of cover portions 230.

Figure 9:
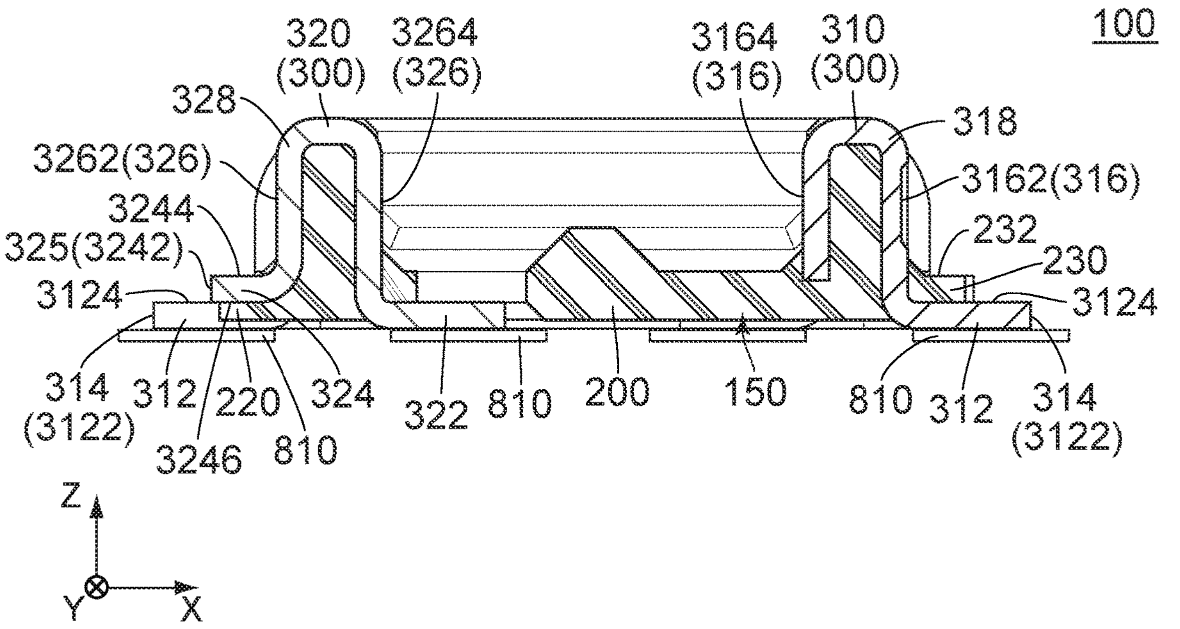
FIG. 9 is a cross-sectional view showing the connector of FIG. 8, taken along line C-C. Regarding the circuit board, the figure shows not all the components, but only the pads.
Figure 10:
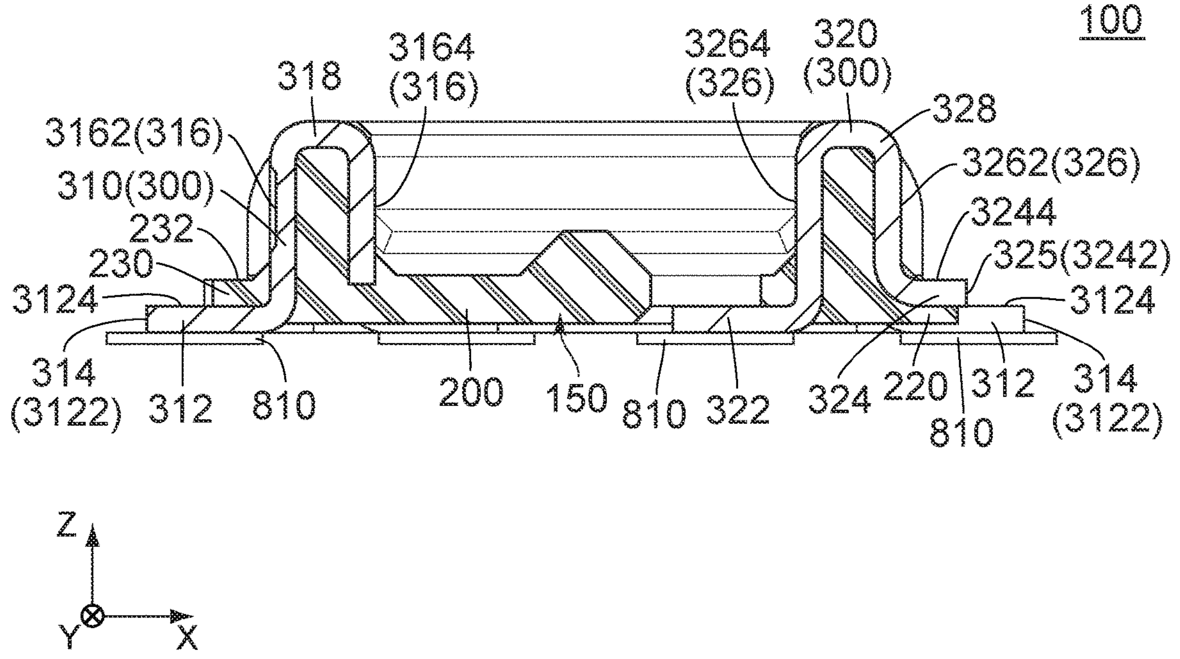
FIG. 10 is a cross-sectional view showing the connector of FIG. 8, taken along line D-D. Regarding the circuit board, the figure shows not all the components, but only the pads.
Figure 11:
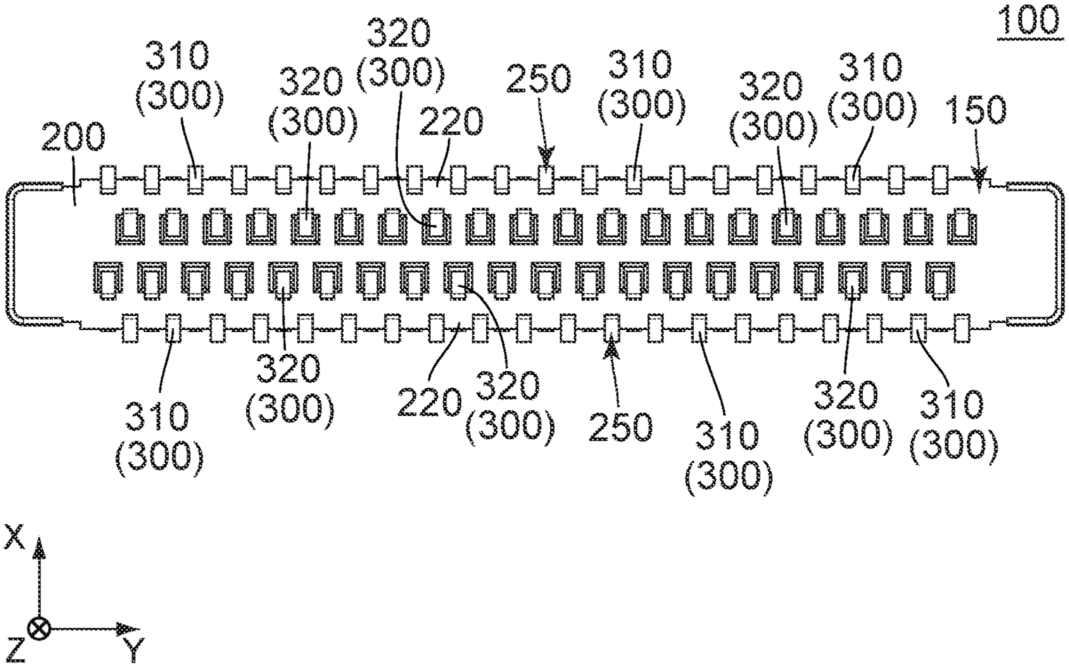
FIG. 11 is a bottom view showing the connector of FIG. 6.

As shown in FIGS. 9 and 10, the insulating protection portion 220 of the present embodiment defines an outer end of the holding member 200 in the width direction. The insulating protection portion 220 defines a lower end of the holding member 200 in the up-down direction.

Referring to FIGS. 9 and 10, the cover portion 230 of the present embodiment defines the outer end of the holding member 200 in the width direction. In the width direction, an outer end of the cover portion 230 is positioned at a position same as a position of an outer end of the insulating protection portion 220. As shown in FIG. 8, the cover portion 230 is adjacent to the insulating protection portion 220 in the pitch direction. The insulating protection portions 220 and the cover portions 230 are alternately arranged in the pitch direction. As shown in FIGS. 4 and 5, each of the cover portions 230 faces the surrounding wall portion 610 in the up-down direction when the connector 100 and the mating connector 500 are mated with each other. As shown in FIG. 9, each of the cover portions 230 has an upper end 232 in the up-down direction.

Referring to FIG. 9, each of the terminals 300 of the present embodiment is made of metal. The terminals 300 are partially embedded in and held by the holding member 200. However, the present invention is not limited thereto, but the terminals 300 should be, at least in part, embedded in and held by the holding member 200. As shown in FIG. 7, the terminals 300 form two terminal rows 250 which are positioned apart from each other in the width direction. In other words, the connector 100 has the two terminal rows 250 which are positioned apart from each other in the width direction, and each of the terminal rows 250 consists of the terminals 300 which are arranged in the pitch direction. Referring to FIGS. 4 and 5, the terminals 300 correspond to the mating terminals 700, respectively.

As shown in FIG. 7, the terminals 300 include a plurality of first terminals 310 and a plurality of second terminals 320. Specifically, the terminals 300 consist of the plurality of first terminals 310 and the plurality of second terminals 320. Each of the terminal rows 250 include a plurality of the first terminals 310 and a plurality of the second terminals 320. The first terminal 310 is adjacent to the second terminal 320 in the pitch direction. The first terminals 310 and the second terminals 320 are arranged in the pitch direction perpendicular to the up-down direction. More specifically, the first terminals 310 and the second terminals 320 are alternately arranged in the pitch direction perpendicular to the up-down direction. In each of the terminal rows 250, the first terminals 310 and the second terminals 320 are alternately arranged in the pitch direction. In the present embodiment, the number of the first terminals 310 and the number of the second terminals 320 are equal to each other. However, the present invention is not limited thereto, but the terminals 300 should include at least one of the first terminal 310 and at least one of the second terminal 320.

As shown in FIG. 7, the first terminals 310 of the present embodiment correspond to the cover portions 230, respectively. The first terminals 310 of the two terminal rows 250 are arranged in a staggered configuration. As shown in FIGS. 10, each of the first terminals 310 has a first mounted portion 312 and a first main portion 318.

As shown in FIG. 10, the first mounted portion 312 of the present embodiment extends in the width direction perpendicular to both the up-down direction and the pitch direction. More specifically, the first mounted portion 312 has no bent portion and linearly extends outward in the width direction. The first mounted portion 312 linearly extends outward in the width direction from the first main portion 318. As understood from FIGS. 6 and 10, under a mounted state where the connector 100 is mounted on the circuit board 800, the first mounted portion 312 is connected to and fixed on the circuit board 800. More specifically, under the mounted state, the first mounted portion 312 is connected to and fixed on a pad 810 of the circuit board 800.

As shown in FIG. 10, the cover portion 230 is positioned above the first mounted portion 312 in the up-down direction. More specifically, each of the cover portions 230 is positioned just above the corresponding first mounted portion 312 in the up-down direction. The cover portion 230 partially covers the first mounted portion 312 from above. Specifically, each of the cover portions 230 partially covers the corresponding first mounted portion 312 from above.

As shown in FIG. 10, the first mounted portion 312 has a first carrier cut-off surface 314 which is an end surface 3122 of the first mounted portion 312, and the end surface 3122 of the first mounted portion 312 faces in the width direction.

As understood from FIGS. 7 and 10, in any of the terminal rows 250, the first carrier cut-off surface 314 faces outward in the width direction. The first carrier cut-off surface 314 is positioned outward of the cover portion 230 in the width direction. More specifically, the first carrier cut-off surface 314 of each of the first terminals 310 is positioned outward of the corresponding cover portion 230 in the width direction.

As shown in FIG. 10, the first mounted portion 312 has an upper surface 3124.

As shown in FIG. 10, the upper surface 3124 of the present embodiment faces upward in the up-down direction. The upper surface 3124 intersects with the up-down direction. Specifically, the upper surface 3124 is perpendicular to the up-down direction.

As shown in FIG. 10, the first main portion 318 of the present embodiment extends from the first mounted portion 312. More specifically, the first main portion 318 extends upward in the up-down direction from an inner end of the first mounted portion 312 in the width direction, and is bent so that it extends inward in the width direction, and is further bent so that it extends downward in the up-down direction. The first main portion 318 has an inverted U-shaped cross-section in a plane perpendicular to the pitch direction. The first main portion 318 is provided with first contact portions 316.

As shown in FIG. 5, each of the first contact portions 316 of the present embodiment is brought into contact with the mating terminal 700 under a mated state where the connector 100 and the mating connector 500 are mated with each other. More specifically, the first contact portions 316 are brought into contact with the first mating contact portions 712, respectively, of the first mating terminal 710 under the mated state. As shown in FIG. 10, each of the first contact portions 316 is positioned above the first mounted portion 312 in the up-down direction.

As shown in FIG. 10, the first contact portions 316 consist of an outer first contact portion 3162 and an inner first contact portion 3164.

As shown in FIG. 10, the outer first contact portion 3162 of the present embodiment faces outward in the width direction. The outer first contact portion 3162 is positioned outward of the inner first contact portion 3164 in the width direction. Referring to FIGS. 7 and 9, the outer first contact portion 3162 of each of the first terminals 310 of the terminal row 250, which is positioned at a front side of the connector 100, faces forward in the front-rear direction. Referring to FIGS. 7 and 10, the outer first contact portion 3162 of each of the first terminals 310 of the terminal row 250, which is positioned at a rear side of the connector 100, faces rearward in the front-rear direction.

As shown in FIG. 10, the inner first contact portion 3164 of the present embodiment faces inward in the width direction. The inner first contact portion 3164 is positioned inward of the outer first contact portion 3162 in the width direction. The inner first contact portion 3164 defines an inner end of the first terminal 310 in the width direction. Referring to FIGS. 7 and 9, the inner first contact portion 3164 of each of the first terminals 310 of the terminal row 250, which is positioned at the front side of the connector 100, faces rearward in the front-rear direction. Referring to FIGS. 7 and 10, the inner first contact portion 3164 of each of the first terminals 310 of the terminal row 250, which is positioned at the rear side of the connector 100, faces forward in the front-rear direction.

Referring to FIGS. 8 and 9, the second terminals 320 of the present embodiment correspond to the insulating protection portions 220, respectively. Referring to FIGS. 7 and 9, the second terminals 320 of the two terminal rows 250 are arranged in a staggered configuration. Each of the second terminals 320 has a second mounted portion 322, a second main portion 328 and an unmounted portion 324.

As shown in FIG. 9, the second mounted portion 322 of the present embodiment extends in the width direction. More specifically, the second mounted portion 322 has no bent portion and linearly extends inward in the width direction. The second mounted portion 322 linearly extends inward in the width direction from the second main portion 328. As understood from FIGS. 6 and 9, under the mounted state, the second mounted portion 322 is connected to and fixed on the circuit board 800. More specifically, under the mounted state, the second mounted portion 322 is connected to and fixed on a pad 810 of the circuit board 800.

As shown in FIG. 9, the second main portion 328 of the present embodiment extends from the second mounted portion 322. More specifically, the second main portion 328 extends upward in the up-down direction from an outer end of the second mounted portion 322 in the width direction, and is bent so that it extends outward in the width direction, and is further bent so that it extends downward in the up-down direction. The second main portion 328 extends from the unmounted portion 324. The second main portion 328 has an inverted U-shaped cross-section in the plane perpendicular to the pitch direction. The second main portion 328 couples the second mounted portion 322 and the unmounted portion 324 with each other. The second main portion 328 is provided with second contact portions 326.

As shown in FIG. 4, each of the second contact portions 326 of the present embodiment is brought into contact with the mating terminal 700 under the mated state. More specifically, the second contact portions 326 are brought into contact with the second mating contact portions 722, respectively, of the second mating terminal 720 under the mated state. As shown in FIG. 9, each of the second contact portions 326 is positioned above the second mounted portion 322 in the up-down direction. Each of the second contact portions 326 is positioned above the unmounted portion 324 in the up-down direction.

As shown in FIG. 9, the second contact portions 326 consist of an outer second contact portion 3262 and an inner second contact portion 3264.

As shown in FIG. 9, the outer second contact portion 3262 of the present embodiment faces outward in the width direction. The outer second contact portion 3262 is positioned outward of the inner second contact portion 3264 in the width direction. Referring to FIGS. 7 and 10, the outer second contact portion 3262 of each of the second terminals 320 of the terminal row 250, which is positioned at the front side of the connector 100, faces forward in the front-rear direction. Referring to FIGS. 7 and 9, the outer second contact portion 3262 of each of the second terminals 320 of the terminal row 250, which is positioned at the rear side of the connector 100, faces rearward in the front-rear direction.

As shown in FIG. 9, the inner second contact portion 3264 of the present embodiment faces inward in the width direction. The inner second contact portion 3264 is positioned inward of the outer second contact portion 3262 in the width direction. Referring to FIGS. 7 and 10, the inner second contact portion 3264 of each of the second terminals 320 of the terminal row 250, which is positioned at the front side of the connector 100, faces rearward in the front-rear direction. Referring to FIGS. 7 and 9, the inner second contact portion 3264 of each of the second terminals 320 of the terminal row 250, which is positioned at the rear side of the connector 100, faces forward in the front-rear direction.

As shown in FIG. 9, the unmounted portion 324 of the present embodiment extends in the width direction. More specifically, the unmounted portion 324 has no bent portion and linearly extends outward in the width direction. The unmounted portion 324 is positioned apart from the second mounted portion 322 in the width direction. The unmounted portion 324 is nearer to the first mounted portion 312 than the second mounted portion 322 is. In other words, a distance between the first mounted portion 312 and the unmounted portion 324 is smaller than a distance between the first mounted portion 312 and the second mounted portion 322. The insulating protection portion 220 is positioned below the unmounted portion 324 in the up-down direction. More specifically, each of the insulating protection portions 220 is positioned just below the unmounted portion 324 of the corresponding second terminal 320 in the up-down direction. As shown in FIG. 7, in a plane perpendicular to the up-down direction, the unmounted portion 324 is partially surrounded by the cover portions 230. Each of two of the cover portions 230 is positioned at a corresponding one of opposite sides of the unmounted portion 324 in the pitch direction.

As shown in FIG. 9, the unmounted portion 324 is positioned above the first mounted portion 312 in the up-down direction. In other words, the connector 100 can have a large isolation distance from the first mounted portion 312 of the first terminal 310 to the unmounted portion 324 of the adjacent second terminal 320. This prevents short-circuiting of the first terminal 310 and the second terminal 320 by a solder joint which connects the first mounted portion 312 and the pad 810 with each other when the first mounted portion 312 is soldered on the pad 810 of the circuit board 800 (see FIG. 6).

As shown in FIG. 9, the unmounted portion 324 has an upper surface 3244 and a lower end 3246.

As shown in FIG. 9, the upper surface 3244 of the present embodiment faces upward in the up-down direction. As shown in FIG. 8, the upper end 232 of the cover portion 230 is positioned at a position same as a position of the upper surface 3244 of the unmounted portion 324 in the up-down direction. However, the present invention is not limited thereto, but the upper end 232 of the cover portion 230 may be positioned below the upper surface 3244 of the unmounted portion 324 in the up-down direction. As shown in FIG. 7, the upper surface 3244 is exposed to the outside of the holding member 200. Thus, the connector 100 of the present embodiment is configured so that a part of the connector 100 in the vicinity of the first mounted portion 312 and the unmounted portion 324 has a reduced size in the up-down direction in comparison with an assumption where the upper surface 3244 of the unmounted portion 324 is covered with the holding member 200.

Referring to FIGS. 4 and 9, the surrounding wall portion 610 of the mating connector 500 faces the upper surface 3244 in the up-down direction under the mated state. If the connector 100 is modified so that the upper surface 3244 of the unmounted portion 324 is covered with a part of the holding member 200, the surrounding wall portion 610 faces the part of the holding member 200 of the modified connector 100 in the up-down direction under the mated state. Specifically, in comparison with the assembly 10 of the present embodiment, an assembly comprising the mating connector 500 and the modified connector 100, in which the upper surface 3244 of the unmounted portion 324 is covered with the part of the holding member 200, has an increased size in the up-down direction under the mated state. In other words, the assembly 10 of the present embodiment has a reduced size in the up-down direction under the mated state in comparison with an assumption where the upper surface 3244 of the unmounted portion 324 is covered with the holding member 200. This can reduce a distance between the circuit board 800, on which the connector 100 is mounted, and a circuit board, on which the mating connector 500 is mounted, when the connector 100 mounted on the circuit board 800 is mated with the mating connector 500 mounted on the circuit board. Thus, a device including the assembly 10 can be downsized.

As shown in FIG. 8, the upper surface 3124 of the first mounted portion 312 and the lower end 3246 of the unmounted portion 324 are positioned at the same position in the up-down direction. The lower end 3246 of the unmounted portion 324 is partially covered with the insulating protection portion 220. This reliably prevents short-circuiting of the adjacent terminals 300 in the connector 100 of the present embodiment. However, the present invention is not limited thereto, but the lower end 3246 of the unmounted portion 324 should be, at least in part, covered with the insulating protection portion 220. This more reliably prevents the short-circuiting of the adjacent terminals 300.

As shown in FIG. 9, the unmounted portion 324 has a second carrier cut-off surface 325 which is an end surface 3242 of the unmounted portion 324, and the end surface 3242 of the unmounted portion 324 faces in the width direction.

As shown in FIG. 9, the second carrier cut-off surface 325 of the present embodiment is positioned outward of the insulating protection portion 220 in the width direction. Referring to FIGS. 7 and 9, in each of the terminal rows 250, the second carrier cut-off surface 325 faces outward in the width direction. The first carrier cut-off surface 314 and the second carrier cut-off surface 325 face in orientations same as each other in the width direction. The unmounted portion 324 is exposed to the outside of the holding member 200 at the second carrier cut-off surface 325 and its vicinity.

As shown in FIG. 9, the first carrier cut-off surface 314 is farther away from the second mounted portion 322 than the second carrier cut-off surface 325 is in the width direction. In other words, the first mounted portion 312 extends outward beyond the unmounted portion 324 in the width direction. Thus, the connector 100 of the present embodiment is configured so that a manufacturer can easily inspect a condition of the solder joint between the first mounted portion 312 and the pad 810 when the first mounted portion 312 is soldered on the pad 810 of the circuit board 800.

(Method of Manufacturing the Connector)

Hereinafter, a detailed description will be made about one example of a method of manufacturing the connector 100 of the present embodiment.

Figure 16:
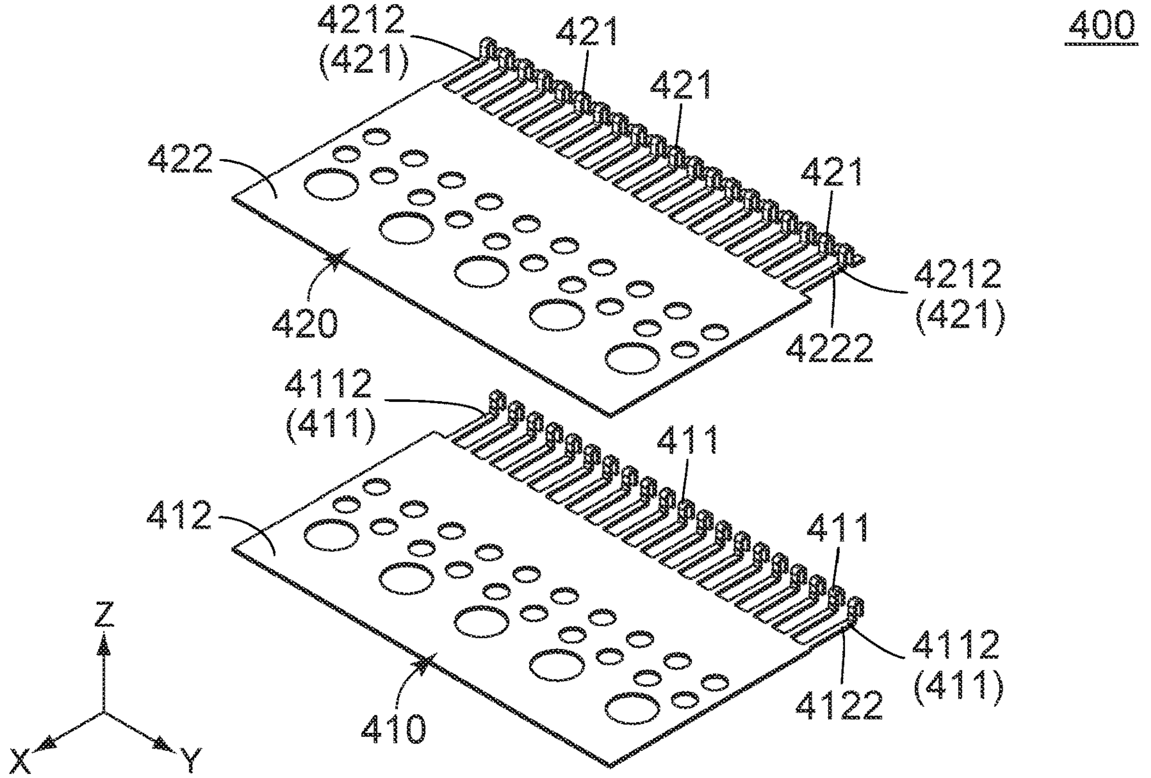
FIG. 16 is another perspective view showing the terminal intermediator of FIG. 15.
Figure 17:
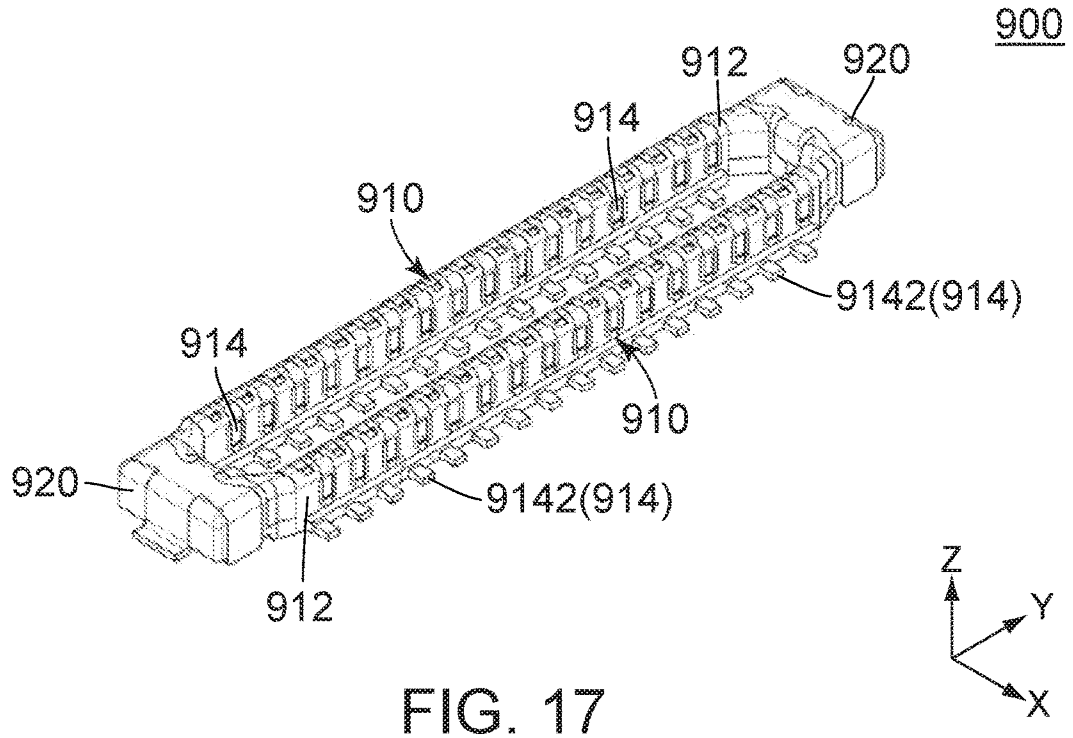
FIG. 17 PRIOR ART
FIG. 17 is a perspective view showing a connector of Patent Document 1.
Figure 18:
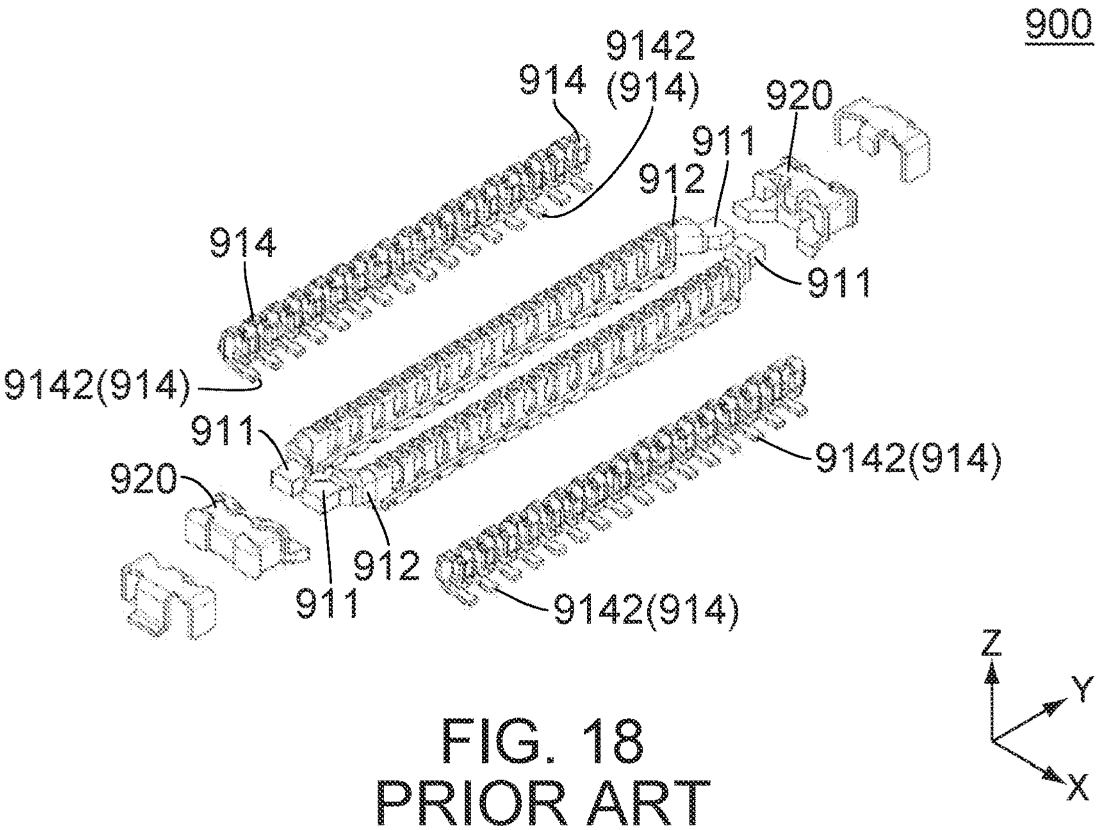
FIG. 18 PRIOR ART
FIG. 18 is an exploded, perspective view showing the connector of FIG. 17.
Figure 19:
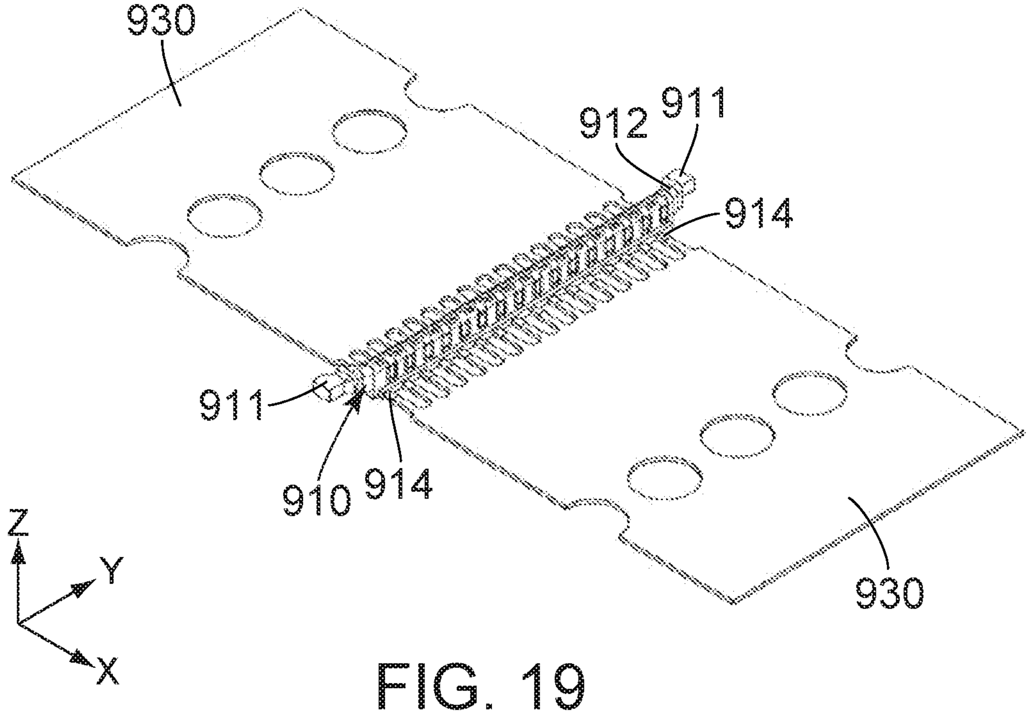
FIG. 19 PRIOR ART
FIG. 19 is a perspective view showing an intermediator of a half-body which is included in the connector of FIG. 17.

First, referring to FIG. 16, a manufacturer prepares two first terminal intermediators 410 by punching out blanks from a metal plate, followed by bending the blanks. Each of the first terminal intermediators 410 consists of a plurality of first terminal blanks 411 and a first carrier 412. Each of the first terminal blanks 411 has a portion 4112 which has no bent portion and linearly extends outward in the width direction. An outward end of the portion 4112 in the width direction is coupled with the first carrier 412 via a first coupling portion 4122.

Similarly, referring to FIG. 16, the manufacturer prepares two second terminal intermediators 420 by punching out blanks from a metal plate, followed by bending the blanks. Each of the second terminal intermediators 420 consists of a plurality of second terminal blanks 421 and a second carrier 422. Each of the second terminal blanks 421 has a portion 4212 which has no bent portion and linearly extends outward in the width direction. An outward end of the portion 4212 in the width direction is coupled with the second carrier 422 via a second coupling portion 4222. The first terminal intermediators 410 and the second terminal intermediators 420 form two terminal intermediators 400 each of which consists of the first terminal intermediator 410 and the second terminal intermediator 420.

Figure 15:
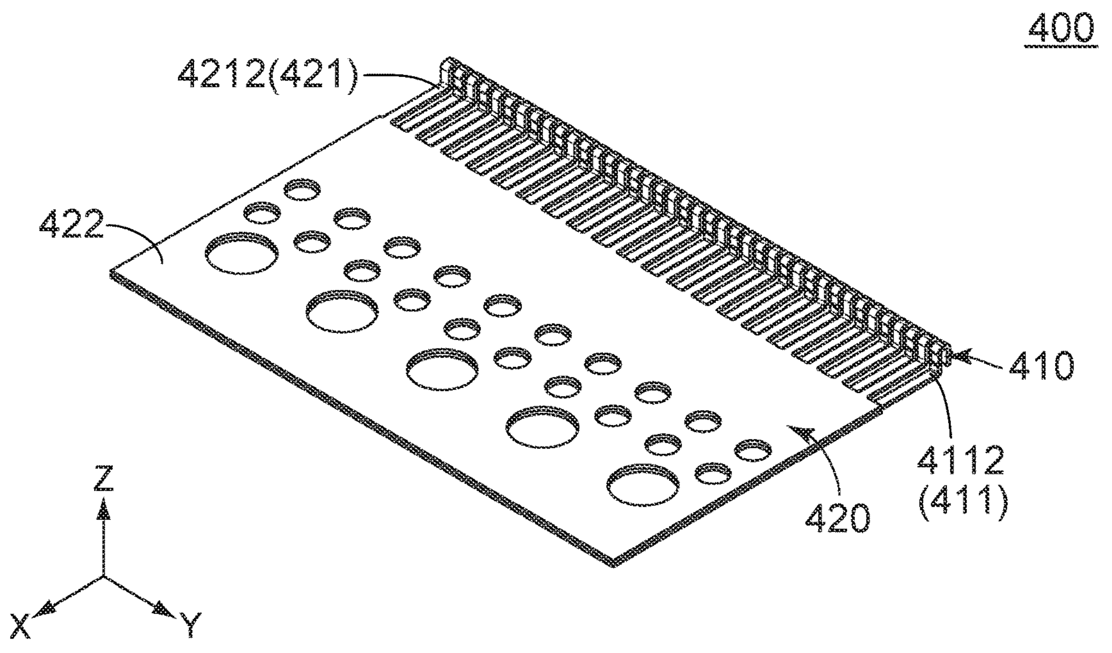
FIG. 15 is a perspective view showing a terminal intermediator which is included in the intermediator of FIG. 12.

Next, in each of the terminal intermediators 400, the second carrier 422 is directly placed on the first carrier 412 so that each of the first terminal blanks 411 is positioned at a position same as a position of a corresponding one of the second terminal blanks 421 in the width direction. Thus, the terminal intermediator 400 changes its state into a state shown in FIG. 15. In each of the terminal intermediators 400, the first terminal blanks 411 and the second terminal blanks 421 are alternately arranged in the pitch direction.

Figure 12:
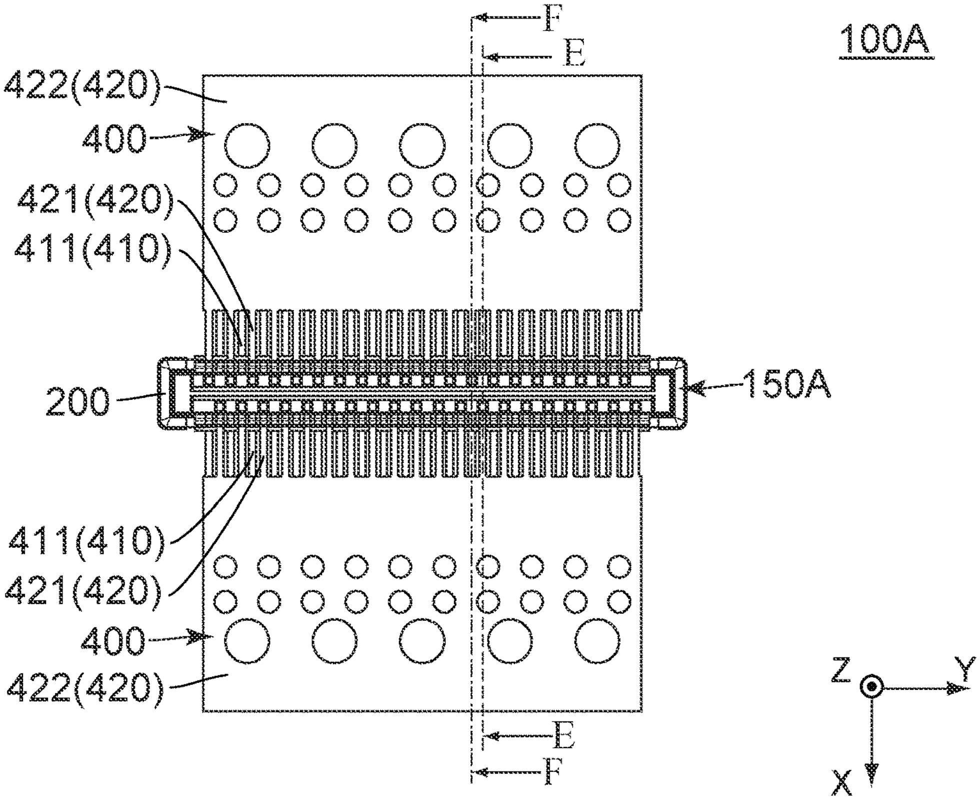
FIG. 12 is a top view showing an intermediator of the connector of FIG. 7. In the figure, first terminal blanks are coupled with first carriers, and second terminal blanks are coupled with second carriers.

After that, the first terminal blanks 411 and the second terminal blanks 421 are placed within a die (not shown) while the two terminal intermediators 400 are arranged in front-to front relationship in the width direction. Then, liquid resin is poured in the die and solidifies. Thus, the holding member 200 is formed while the first terminal blanks 411 and the second terminal blanks 421 are held by the second holding member 200. In other words, referring to FIG. 12, the manufacturer manufactures an intermediator 100A comprising an insert-molded intermediator 150A.

Figure 13:
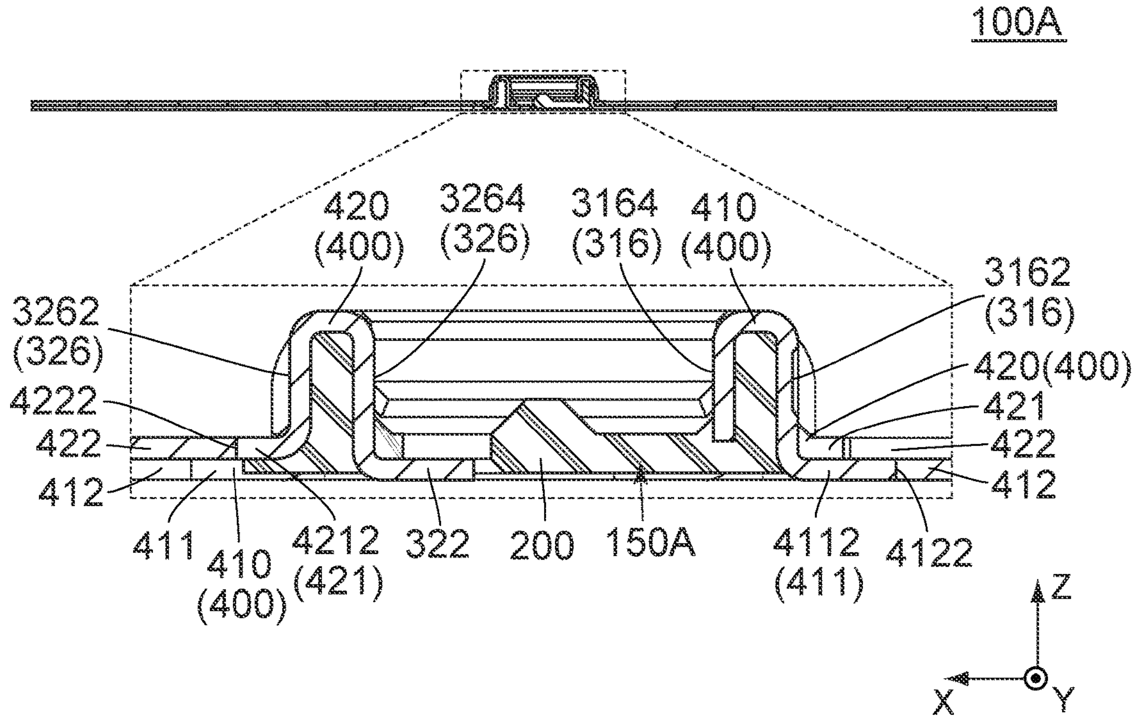
FIG. 13 is a cross-sectional view showing the intermediator of FIG. 12, taken along line E-E.
Figure 14:
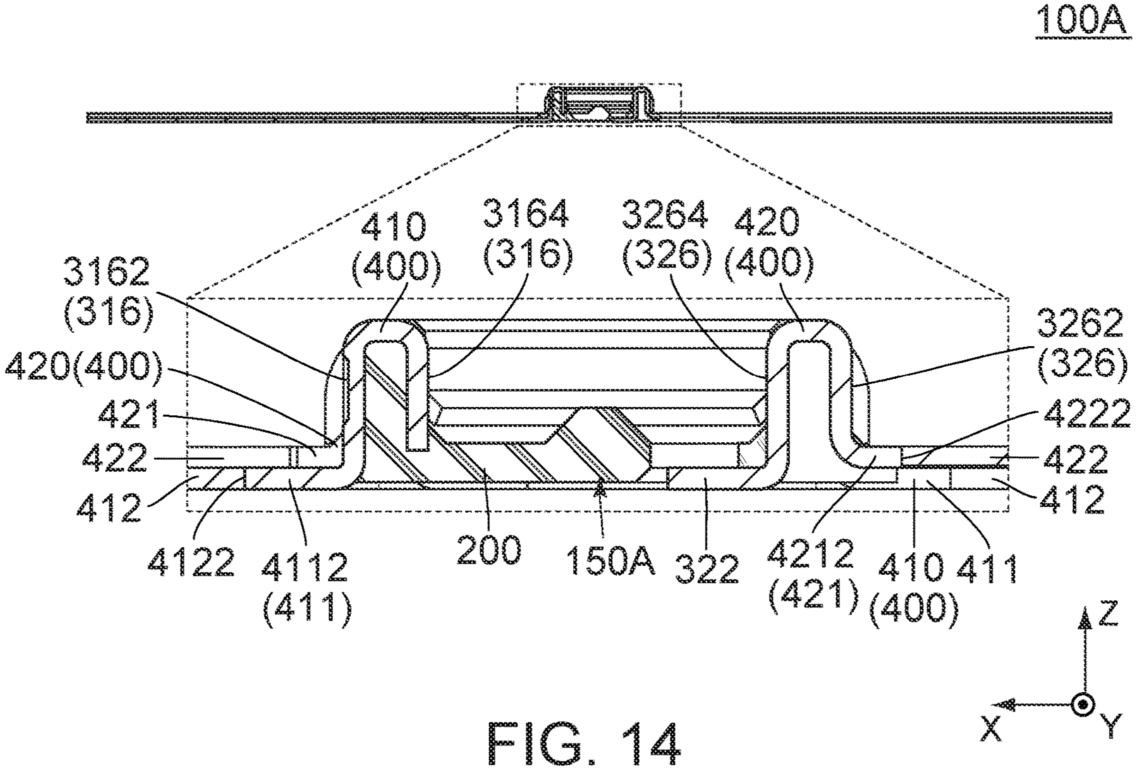
FIG. 14 is a cross-sectional view showing the intermediator of FIG. 12, taken along line F-F.

Finally, referring to FIGS. 13 and 14, each of the first coupling portions 4122 and the second coupling portions 4222 is split into two pieces so that each of the first terminal blanks 411 is separated from first carrier 412 while each of the second terminal blanks 421 is separated from the second carrier 422. Thus, the first terminal blanks 411 become the first terminals 310, respectively, and a cut surface of the first coupling portion 4122 becomes the first carrier cut-off surface 314, and the portion 4112 becomes the first mounted portion 312. Similarly, the second terminal blanks 421 become the second terminals 320, respectively, and a cut surface of the second coupling portion 4222 becomes the second carrier cut-off surface 325, and the portion 4212 becomes the unmounted portion 324. In other words, the insert-molded intermediator 150A becomes the insert-molded body 150, and the connector 100 of the present embodiment is manufactured.

According to the aforementioned manufacturing method, the connector 100 of the present embodiment, which comprises the two terminal rows 250, can be manufactured in a single molding step. In the connector 100 manufactured by the aforementioned manufacturing method, both of the first carrier cut-off surface 314 and the second carrier cut-off surface 325 of each of the terminal rows 250 face outward in the width direction.

In the aforementioned manufacturing method, the portion 4112, which becomes the first mounted portion 312, has no bent portion and linearly extends outward in the width direction, while the portion 4212, which becomes the unmounted portion 324, has no bent portion and linearly extends outward in the width direction. In the aforementioned manufacturing method, the second carrier 422, with which the portion 4212 becoming the unmounted portion 324 is coupled, is directly placed on the first carrier 412 with which the portion 4112 becoming the first mounted portion 312 is coupled. Thus, in the connector 100 manufactured by the aforementioned manufacturing method, the upper surface 3124 of the first mounted portion 312 and the lower end 3246 of the unmounted portion 324 are positioned at the same position in the up-down direction.

In the aforementioned manufacturing method, the terminal intermediator 400 consists of the first terminal intermediator 410 and the second terminal intermediator 420, and the first terminal blanks 411 of the first terminal intermediator 410 and the second terminal blanks 421 of the second terminal intermediator 420 are alternately arranged in the pitch direction. Thus, in the aforementioned manufacturing method, a distance between adjacent two of the first terminal blanks 411 is greater than a distance between the first terminal blank 411 and the second terminal blank 421. Additionally, in the aforementioned manufacturing method, a distance between adjacent two of the second terminal blanks 421 is greater than the distance between the first terminal blank 411 and the second terminal blank 421. That is, in the aforementioned manufacturing method, the terminal intermediator 400 can have a certain distance between the adjacent first terminal blanks 411 even in a case where the distance between the first terminal blank 411 and the second terminal blank 421 is reduced. Similarly, in the aforementioned manufacturing method, the terminal intermediator 400 can have a certain distance between the adjacent second terminal blanks 421 even in this case. Thus, even in a case where a manufacturer manufactures the connector 100 whose terminals 300 are arranged at small intervals, the manufacturer can easily perform the punching out and bending of the first terminal blanks 411, which become the first terminals 310, and the separation of the first terminal blanks 411 from the first carrier 412. Similarly, even in this case, the manufacturer can easily perform the punching out and bending of the second terminal blanks 421, which become the second terminals 320, and the separation of the second terminal blanks 421 from the second carrier 422. In other words, the connector 100 of the present embodiment can be easily manufactured even if the terminals 300 are arranged at small intervals.

Although the specific explanation about the present invention is made above referring to the embodiments, the present invention is not limited thereto and is susceptible to various modifications and alternative forms.

Although the connector 100 of the present embodiment has the two terminal rows 250 which are positioned apart from each other in the width direction, the present invention is not limited thereto. Specifically, the connector 100 may have a single terminal row 250. Such a connector 100 with a single terminal row 250 can be manufactured as follows: the first terminal blanks 411, which are coupled with the first carrier 412 at one side of the terminal intermediator 400 in the width direction, and the second terminal blanks 421, which are coupled with the second carrier 422 at the one side of the terminal intermediator 400 in the width direction, are placed within a die; and subsequent manufacturing processes, which include an insert molding process, are the same as those of the aforementioned manufacturing method of the connector 100 of the present embodiment. According to this manufacturing method, both of the first carrier 412 and the second carrier 422 can be arranged at the same side of the die in the width direction. This can reduce a size of the die, which is used in the insert molding process, in comparison with an assumption where the first carrier 412 and the second carrier 422 are arranged at opposite sides, respectively, of the die in the width direction. In other words, the connector 100 with the single terminal row 250 also has a structure more suitable for insert-molding. Similar to the connector 100 of the present embodiment, the connector 100 with the single terminal row 250 is also configured so that the first carrier cut-off surface 314 of the first terminal 310 and the second carrier cut-off surface 325 of the second terminal 320 face in orientation same as each other in the width direction. Additionally, similar to the connector 100 of the present embodiment, the connector 100 with the single terminal row 250 is also configured so that the unmounted portion 324 of the second terminal 320 is positioned above the first mounted portion 312 of the first terminal 310 in the up-down direction. Accordingly, the connector 100 with the single terminal row 250 can have a large isolation distance from the first mounted portion 312 of the first terminal 310 to the unmounted portion 324 of the adjacent second terminal 320. Thus, in the connector 100 with the single terminal row 250, the first terminal 310 and the second terminal 320 are prevented from being short-circuited with each other by a solder joint which connects the first mounted portion 312 and the pad 810 with each other when the first mounted portion 312 is soldered on the pad 810 of the circuit board 800.

Although the terminal intermediator 400 of the aforementioned embodiment is configured so that the first terminal blanks 411 are coupled with the first carrier 412 while the second terminal blanks 421 are coupled with the second carrier 422 which is distinct and separated from the first carrier 412, the present invention is not limited thereto. Specifically, the terminal intermediator 400 may be modified so that the first terminal blanks 411 and the second terminal blanks 421 are coupled with a common carrier. In this case, a coupling portion between the second terminal blank 421 and the common carrier should be provided with a part, which has a cranked shape when the part is viewed in the pitch direction, so that the coupling portion provides an elevation difference between the second terminal blank 421 and the common carrier in the up-down direction. The provision of the part enables a portion of the modified terminal intermediator 400, which becomes the first carrier cut-off surface 314, and a portion of the modified terminal intermediator 400, which becomes the second carrier cut-off surface 325, to be deviated from each other in the up-down direction.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector mounted on a circuit board when used, wherein:

the connector is mateable in an up-down direction with a mating connector which has a mating terminal;

the connector comprises an insert-molded body;

the insert-molded body comprises a holding member and a plurality of terminals;

the terminals are, at least in part, embedded in and held by the holding member;

the terminals include at least one first terminal and at least one second terminal;

the first terminal and the second terminal are arranged in a pitch direction perpendicular to the up-down direction;

the first terminal has a first mounted portion and a first main portion;

the first mounted portion extends in a width direction perpendicular to both the up-down direction and the pitch direction;

under a mounted state where the connector is mounted on the circuit board, the first mounted portion is connected to and fixed on the circuit board;

the first mounted portion has a first carrier cut-off surface which is an end surface of the first mounted portion;

the end surface of the first mounted portion faces in the width direction;

the first main portion extends from the first mounted portion;

the first main portion is provided with a first contact portion;

the first contact portion is brought into contact with the mating terminal under a mated state where the connector and the mating connector are mated with each other;

the first contact portion is positioned above the first mounted portion in the up-down direction;

the second terminal has a second mounted portion, a second main portion and an unmounted portion;

the second mounted portion extends in the width direction;

under the mounted state, the second mounted portion is connected to and fixed on the circuit board;

the second main portion couples the second mounted portion and the unmounted portion with each other;

the second main portion is provided with a second contact portion;

the second contact portion is brought into contact with the mating terminal under the mated state;

the unmounted portion extends in the width direction;

the unmounted portion is positioned apart from the second mounted portion in the width direction;

the unmounted portion is positioned above the first mounted portion in the up-down direction;

the unmounted portion is nearer to the first mounted portion than the second mounted portion is;

the unmounted portion has a second carrier cut-off surface which is an end surface of the unmounted portion;

the end surface of the unmounted portion faces in the width direction; and the first carrier cut-off surface and the second carrier cut-off surface face in orientations same as each other in the width direction.

2. The connector as recited in claim 1, wherein:

the holding member has an insulating protection portion;

the insulating protection portion is positioned below the unmounted portion in the up-down direction;

the unmounted portion has a lower end in the up-down direction; and the lower end of the unmounted portion is, at least in part, covered with the insulating protection portion.

3. The connector as recited in claim 1, wherein:

the at least one first terminal includes a plurality of the first terminals;

the at least one second terminal includes a plurality of the second terminals; and the first terminals and the second terminals are alternately arranged in the pitch direction.

4. The connector as recited in claim 1, wherein the first carrier cut-off surface is farther away from the second mounted portion than the second carrier cut-off surface is in the width direction.

5. The connector as recited in claim 1, wherein:

the unmounted portion has an upper surface in the up-down direction; and the upper surface of the unmounted portion is exposed to an outside of the holding member.

6. The connector as recited in claim 1, wherein:

the connector has two terminal rows which are positioned apart from each other in the width direction;

each of the terminal rows consists of the terminals which are arranged in the pitch direction;

in each of the terminal rows, the first carrier cut-off surface faces outward in the width direction; and in each of the terminal rows, the second carrier cut-off surface faces outward in the width direction.

* * * * *